United States Patent
Glover et al.

(10) Patent No.: US 6,910,860 B2
(45) Date of Patent: *Jun. 28, 2005

(54) MACHINED FAN EXIT GUIDE VANE ATTACHMENT POCKETS FOR USE IN A GAS TURBINE

(75) Inventors: Samuel L. Glover, Bridgeport, CT (US); Thomas E. Manning, Rocky Hill, CT (US)

(73) Assignee: United Technologies Corporation, Hartford, CT (US)

(*) Notice: Subject to any disclaimer, the term of this patent is extended or adjusted under 35 U.S.C. 154(b) by 148 days.

This patent is subject to a terminal disclaimer.

(21) Appl. No.: 10/452,428

(22) Filed: May 30, 2003

(65) Prior Publication Data

US 2004/0033137 A1 Feb. 19, 2004

Related U.S. Application Data

(63) Continuation of application No. 09/741,471, filed on Dec. 19, 2000, now Pat. No. 6,619,917.

(51) Int. Cl.[7] .................................................. F01D 1/02
(52) U.S. Cl. ..................................... 415/209.3; 415/191
(58) Field of Search ............................. 415/209.3, 191, 415/208.2, 209.4, 210.1, 200; 29/888.22

(56) References Cited

U.S. PATENT DOCUMENTS

| | | | | | |
|---|---|---|---|---|---|
| 4,639,189 | A | * | 1/1987 | Rosman | 415/115 |
| 5,062,767 | A | * | 11/1991 | Worley et al. | 415/209.3 |
| 6,409,472 | B1 | * | 6/2002 | McMahon et al. | 415/189 |
| 6,619,917 | B2 | * | 9/2003 | Glover et al. | 415/209.3 |

* cited by examiner

*Primary Examiner*—Edward K. Look
*Assistant Examiner*—Igor Kershteyn
(74) *Attorney, Agent, or Firm*—Bachman & LaPointe, P.C.

(57) ABSTRACT

The present invention relates to an improved system for installing a vane in a gas turbine. The system includes a receptor pocket positioned within a first support structure and a boot attached to a first or inner end of a vane for insertion into the receptor pocket. In a first embodiment of the present invention, the receptor pocket is formed by machining it into the support structure. In a second embodiment of the present invention, the receptor pocket is formed by an insert which is installed into the support structure. In accordance with the present invention, the inner end of the vane having the boot is first inserted into the receptor pocket. After insertion has been completed, the vane is rotated until an outer base is brought into position against an outer support structure. The outer end of the vane is then secured to the outer support structure using studs and nuts.

19 Claims, 7 Drawing Sheets

MACHINED FAN EXIT GUIDE VANE ATTACHMENT POCKETS FOR USE IN A GAS TURBINE

CROSS REFERENCE TO RELATED APPLICATION(S)

This application is a continuation of allowed U.S. patent application Ser. No. 09/741,471, filed Dec. 19, 2000 now U.S. Pat. No. 6,619,917, entitled "MACHINED FAN EXIT GUIDE VANE ATTACHMENT POCKETS FOR USE IN A GAS TURBINE", by Samuel L. Glover et al.

BACKGROUND OF THE INVENTION

The present invention relates to an improved fan exit guide vane installation system for use in gas turbines.

In a gas turbine engine used for propulsion, a fan case and a smaller diameter compressor case cooperate to radially bound an annular fan duct. Fan exit guide vanes span across the fan duct to de-swirl working medium fluid flowing therethrough. The outer and inner extremities of the vanes are connected to the fan and compressor cases respectively. Traditionally, the outer connection is effected by a pair of bolts. The inner connection, by contrast, includes numerous parts including spacers, nuts, bolts, and inserts.

This type of system presents problems from a replacement or maintenance standpoint. Occasionally, a vane will become damaged in use and need to be replaced. Using the connection system described above, replacement of a single damaged vane is difficult. In U.S. Pat. No. 5,690,469 to Deal et al., the issue of replacing a vane is addressed. In this patent, a repair kit for replacing an unserviceable vane assembly is described. The repair kit includes a serviceable vane subassembly having a serviceable airfoil with a base attached to the root end and an opposing base which is unattached to, but slidably engagable with the serviceable airfoil. The opposing base is slipped over the tip end of the airfoil and slid toward the base attached to the root end. The vane subassembly and opposing base are pivoted into position between inner and outer engine cases in place of an unserviceable vane assembly so that sockets in the attached base engage support pins extending from the inner case. An adhesive is applied to the tip end of the serviceable airfoil and the opposing base is translated into its installed position near the tip end of the serviceable airfoil. Upon curing of the adhesive, the opposing base becomes attached to the airfoil. The base is secured to the outer case by studs and nuts.

There is a need for a simpler system for installing fan exit guide vanes which reduces the quantity of parts, the cost of the parts, and the weight of the parts. There is also a need for a simpler system which facilities the repair of damaged vanes.

SUMMARY OF THE INVENTION

Accordingly, it is an object of the present invention to provide an improved system for installing a vane such as a fan exit guide vane to a support structure in a gas turbine.

It is a further object of the present invention to provide a system as above which has a reduced quantity of connection parts and reduced weight.

It is a yet another object of the present invention to provide an economically beneficial installation system.

The foregoing objects are attained by the system of the present invention.

In accordance with the present invention, a system for installing a vane broadly comprises a structure for supporting an inner end of a vane, a receptor pocket in the support structure, and a boot attached to a first or inner end of the vane for insertion into the receptor pocket. In a first embodiment of the present invention, the receptor pocket is machined into the support structure and is preferably open-ended and curved in configuration. The boot is preferably formed from a resilient dampening material, such as silicone rubber, and has a depth greater than the depth of the receptor pocket in the support structure.

In an alternative embodiment of the system of the present invention, an opening is machined into the support structure and an insert is placed into the opening to act as the receptor pocket. To install a vane, the boot on the vane is placed in the insert. The insert is provided with a flange portion which rests on a peripheral ledge machined in the support structure. The peripheral ledge maintains an upper surface of the flange portion substantially flush with an upper surface of the support structure. Retention devices may be used to hold the insert within the opening.

Other details of the installation system of the present invention, as well as other objects and advantages attendant thereto, are set forth in the following detailed description and the accompanying drawings in which like reference numerals depict like elements.

DETAILED DESCRIPTION OF THE PREFERRED EMBODIMENT(S)

Figure 1:
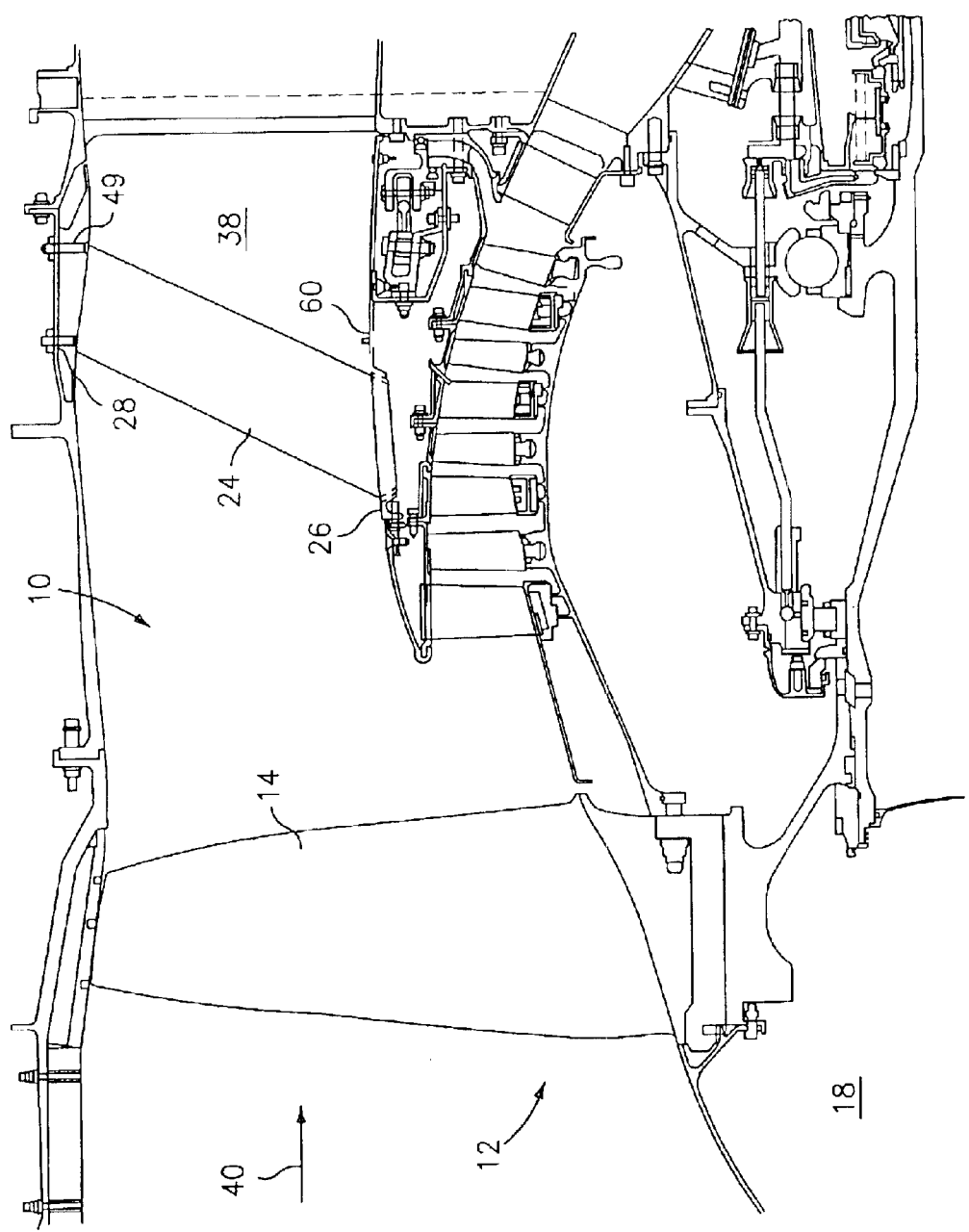
FIG. 1 illustrates a portion of a gas turbine engine having a vane installed in accordance with the present invention.

Referring to FIG. 1, a gas turbine engine 10 of the type used for aircraft propulsion includes a fan section 12 having an array of fan blades such as representative blade 14 extending radially outwardly from a hub 18. The hub and blades are rotatable about an engine axis. The fan also includes an array of fan exit guide vane assemblies, such as representative guide van assembly 24, which extend radially between inner and outer cases 26 and 28 respectively, whose axes are common with the engine axis. A fan flowpath 38 extends through the fan section and a working medium fluid, such as air, flows through the flowpath in the directly generally indicated by directional arrow 40.

Figure 5:
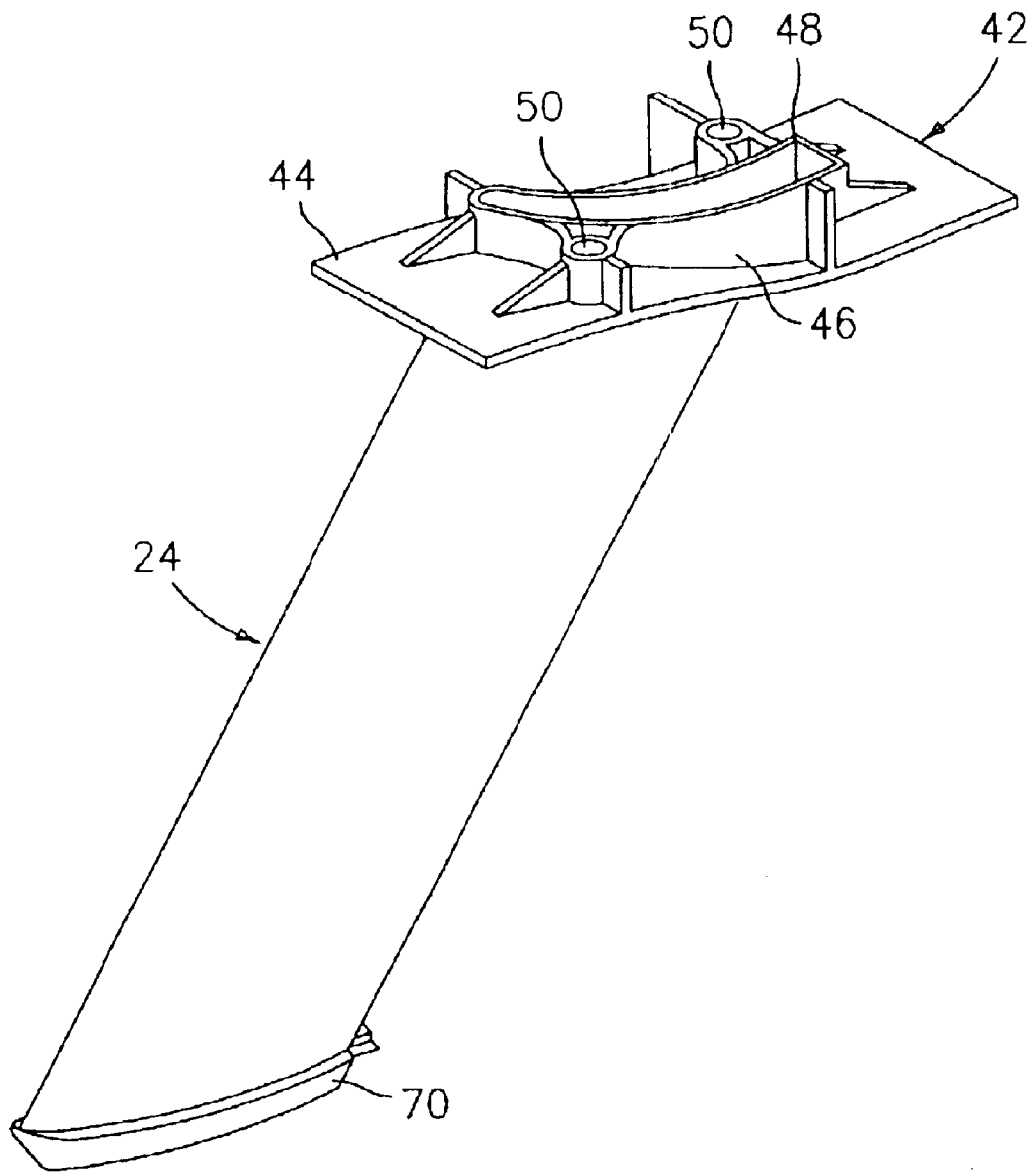
FIG. 5 is a perspective view of a vane used in the system of the present invention.
Figure 6:
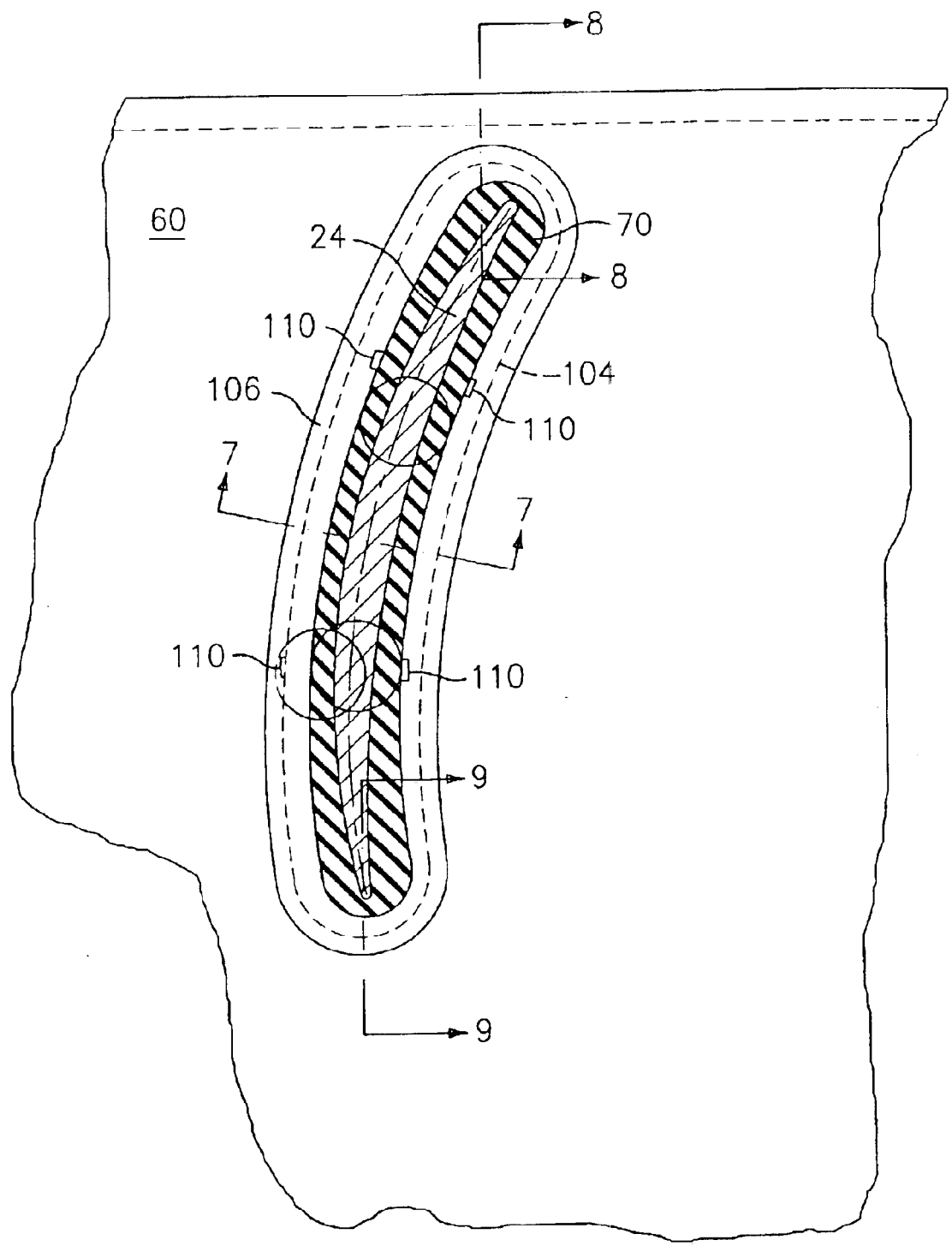
FIG. 6 is a top view in partial section of an alternative manner for installing a vane in a support structure in accordance with the present invention.

As shown in FIG. 5, each fan exit guide vane 24 in the array of fan exit guide vanes has an outer end with an integrally formed outer base 42. The outer base has a platform 44 and a sleeve 46. Typically, a polyurethane material 48 is disposed within the sleeve 46. The polyurethane material serves to damp vibrations in the vane and the overall assembly. Threaded studs 49 project outwardly from the outer base 42 and extend through holes 50 into the outer case 28. Nuts 51, threaded onto the studs 49, positively secure the outer base 42, and therefore, the outer end of a respective vane 24 to the outer case 28.

Figure 2:
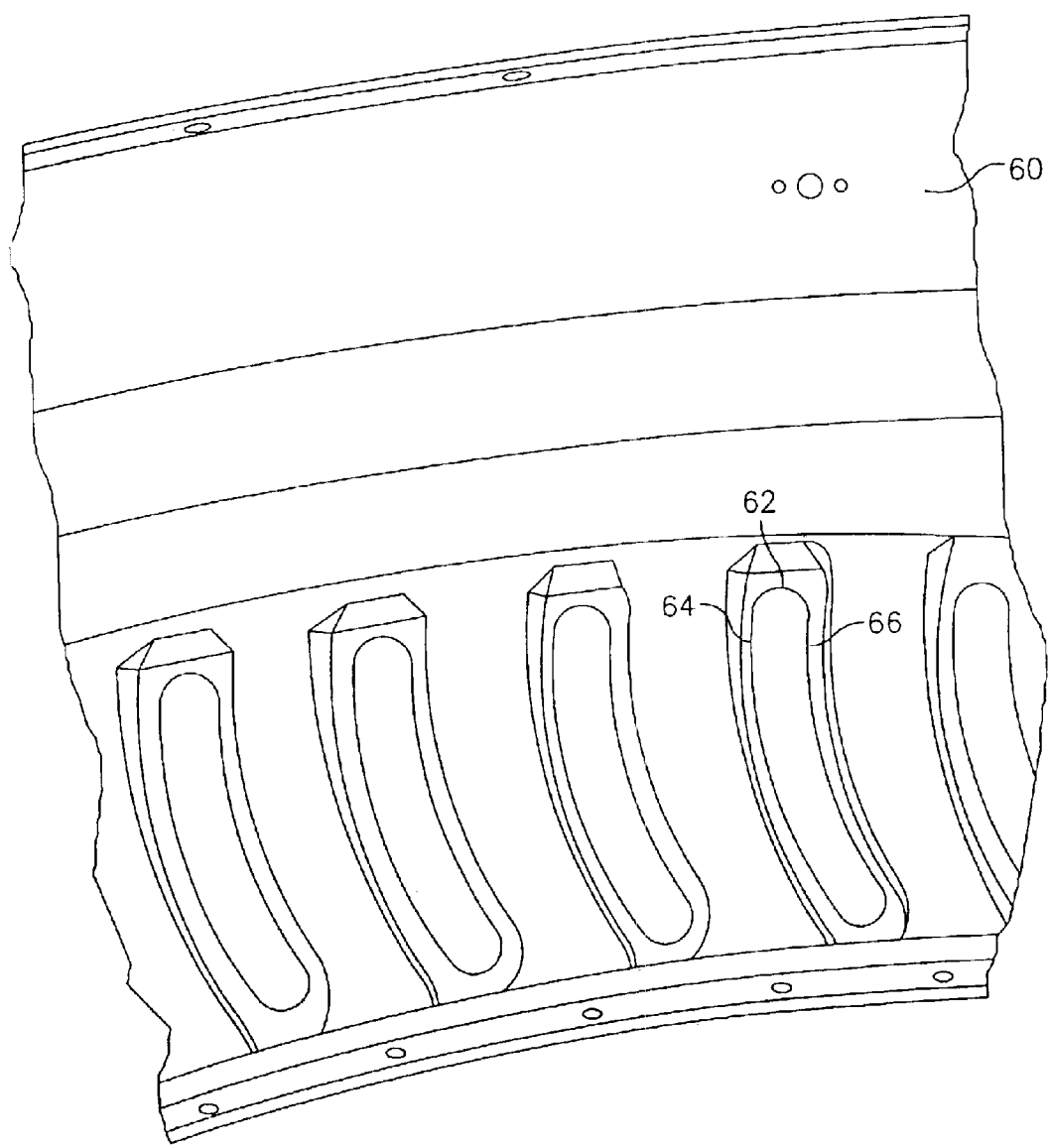
FIG. 2 illustrates a support structure having machined receptor pockets used in the system of the present invention.

The inner end of each fan exit guide vane 24 in the array of fan exit guide vanes is attached to an inner support structure such as an annular ring portion 60 which forms part of the inner case 26. In accordance with the a first embodiment of the present invention, the annular ring portion 60 is provided with an array of open-ended receptor pockets 62 machined therein. The array of receptor pockets 62 extends around the circumference of the ring portion 60 with respective ones of the pockets receiving the inner ends of respective fan exit guide vanes 24. As can be seen from FIG. 2, each receptor pocket 62 has arcuately shaped sidewalls 64 and 66 which conform to the shape of the inner end of the vane 24.

Figure 3:
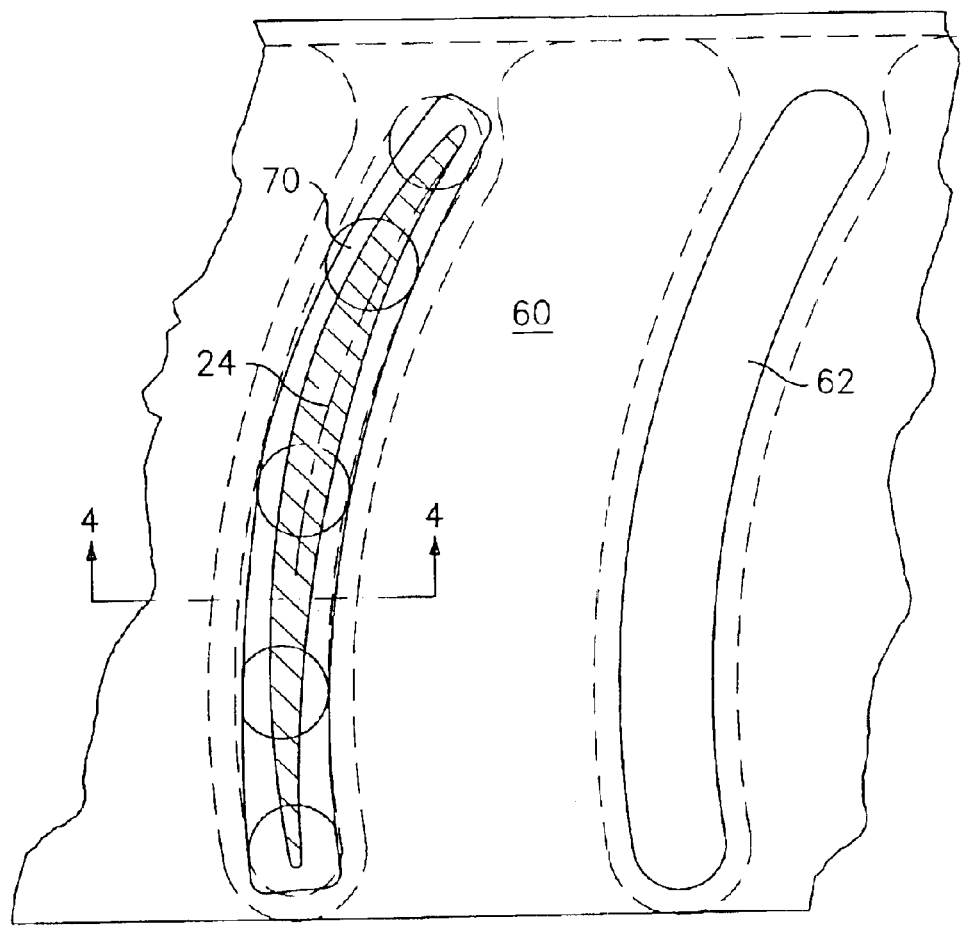
FIG. 3 is a top view in partial section of a vane installed in a support structure.
Figure 4:
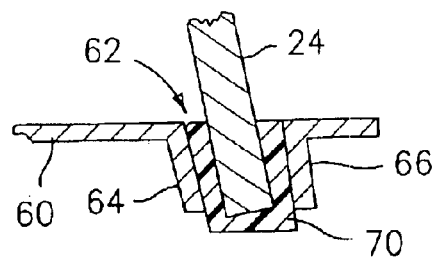
FIG. 4 is a sectional view taken along lines 4—4 in FIG. 3.

Referring now to FIGS. 3–5, the inner end of each vane 24 has a boot 70. The boot 70 may be formed integrally with the vane 24 or may be formed separately from the vane 24 and attached thereto using any suitable adhesive means known in the art. The boot 70, as can be seen from FIGS. 3 and 4, is configured to fit securely within one of the receptor pockets 62.

The boot 70 is preferably formed from a resilient dampening material, such as silicone rubber, to help absorb vibrations. The boot 70 preferably has a depth which is greater than the depth of the sidewalls 64 and 66 of a receptor pocket 62 into which it is to be inserted so as to firmly secure the inner end of the vane 24 into the receptor pocket 62.

To install a vane 24 using the system of the present invention, the inner end of the vane 24 with the boot 70 is inserted into a receptor pocket 62. The vane 24 is then rotated towards the outer case 28 and the studs 49 and the nuts 51 are installed to secure the outer end of the vane 24 to the outer case 28.

Figure 10:
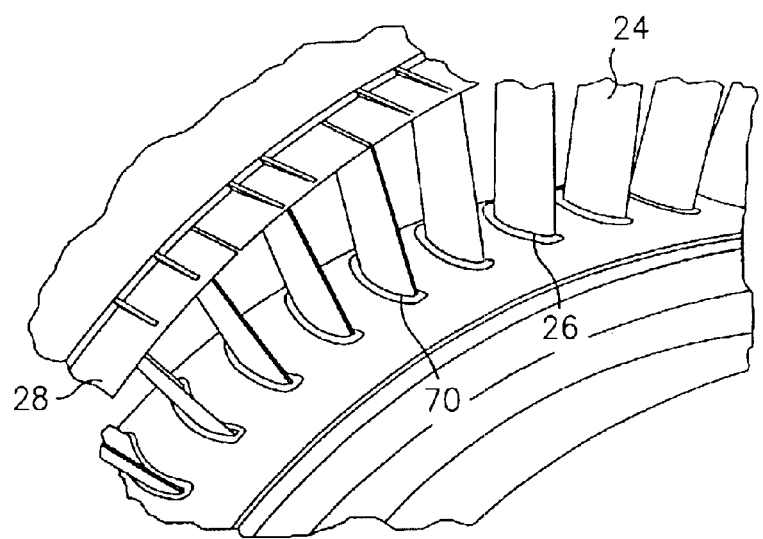
FIG. 10 is a perspective view of a portion of a fan exit guide array attached to inner and outer support structures in accordance with the installation system of FIGS. 2–5.

FIG. 10 illustrates a portion of an array of fan exit guide vanes 24 mounted to inner and outer casings 26 and 28 respectively. The inner ends of the vanes 24 are installed using the system of FIGS. 2–5.

FIGS. 6–9 illustrate an alternative embodiment of a vane installation system in accordance with the present invention. In this system, a series of openings 100 are machined into an inner support structure such as the annular ring portion 60 of the inner casing 26. Each of the openings 100 is provided with a peripheral ledge 102.

A receptor pocket for the inner end of the vane 24 is formed by a flanged insert 104, preferably in the form of a flanged cup insert. As can be seen from the drawings, the insert 104 has an outwardly extending, peripheral flange 106 about its periphery. The insert 104 may be formed from any suitable metallic or non-metallic material known in the art. Preferably, it is formed from a plastic material such as nylon, polyurethane, or an elastomeric plastic material. For example, the insert 104 could be formed from a nylon material having a graphite filler.

Figure 7:
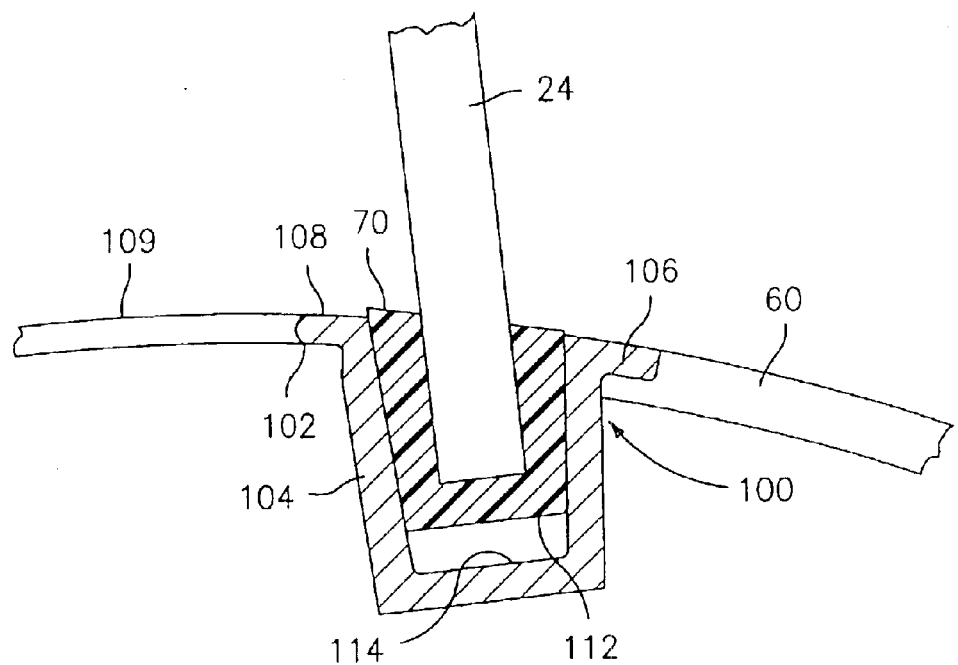
FIG. 7 is a sectional view taken along lines 7—7 in FIG. 6.
Figure 8:
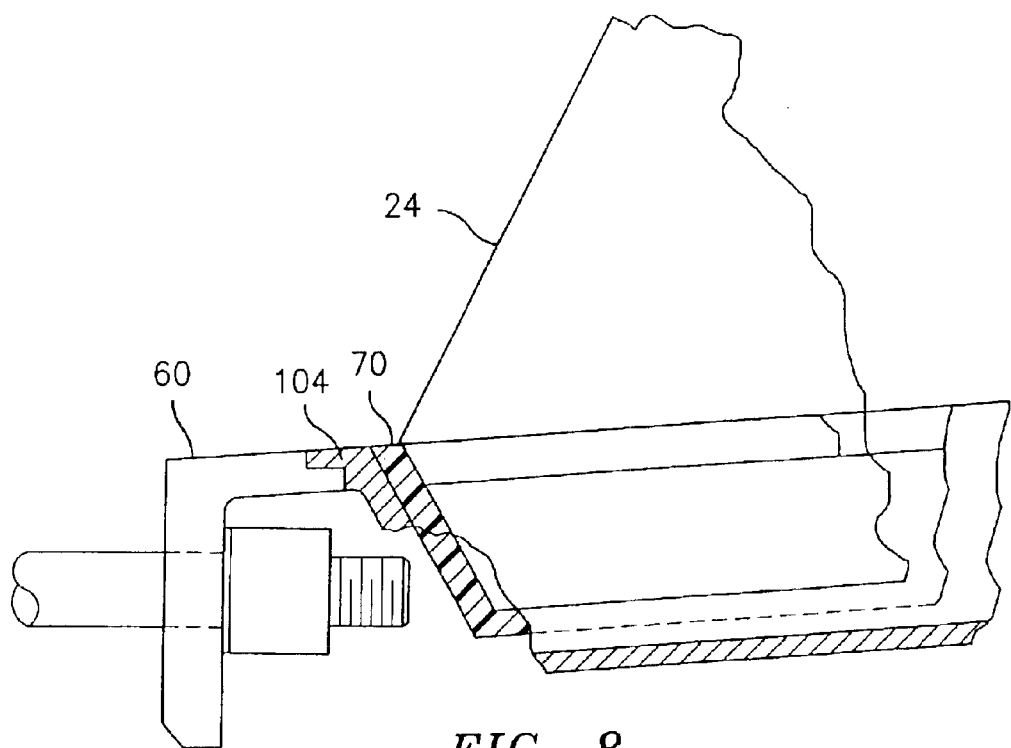
FIG. 8 is a sectional view taken along lines 8—8 in FIG. 6.
Figure 9:
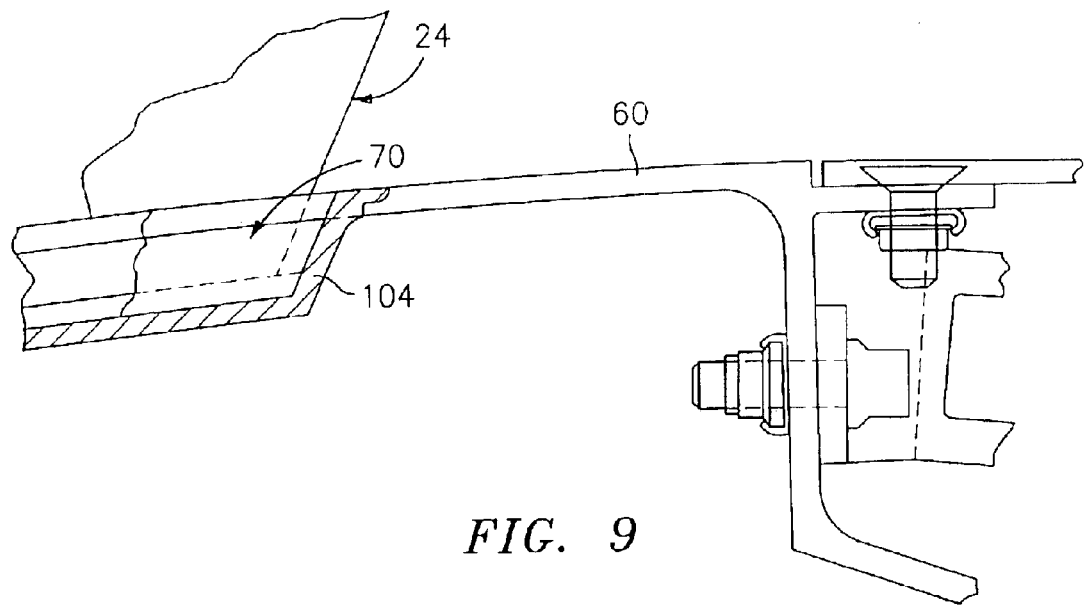
FIG. 9 is a sectional view taken along lines 9—9 in FIG. 6.

As shown in FIG. 7, when the insert 104 is installed in the opening 100, the flange portion 106 rests on the peripheral ledge 102. As a result, the upper surface 108 of the insert 104 is substantially flush with the upper surface 109 of the annular ring portion 60.

To keep the insert 104 within the opening 100, a plurality of retention devices 110 can be inserted between a respective side wall of the insert 104 and a respective side wall of the opening 100. The retention devices 110 may comprise any suitable retention device known in the art.

As can be seen from the drawings, the insert 104 has a depth which is greater than the depth of the opening 100. The depth of the insert 104 preferably is such that the insert 104 secures the inner end of the vane 24 to the inner casing 26.

To install a vane 24 using this embodiment of the present invention, the boot 70 on a vane 24 is positioned within the insert 104. Depending on the depth of the insert 104, the bottom end 112 of the boot 70 may be spaced from, or may be in contact with, the bottom surface 114 of the insert 104. After the boot 70 has been positioned in the insert 104, the vane 24 is rotated to bring the outer base 42 into contact with the outer casing 28. As before, studs 49 and nuts 51 are then used to secure the outer end of the vane 24 to the casing 28.

It has been found that an installation system in accordance with the present invention provides a number of significant advantages over prior art installation systems. For example, the installation system permits a tight fit to be maintained between the boot on each vane and the sidewalls of each pocket 62 during cruise and take-off. This results in the absence of any substantial air leakage around the flowpath. The installation system of the present invention uses fewer parts than prior installations, has a reduced cost associated with it, and a reduced weight. The installation system of the present invention also lends itself to single vane replacement.

While the installation system of the present invention has been described in the context of installing fan exit guide vanes in gas turbine engines used for propulsion, it should be apparent that the system of the present invention may also be used to install other types of vanes in a gas turbine engine used for propulsion or in other types of gas turbines.

It is apparent that there has been provided in accordance with the present invention a machined fan exit guide vane attachment pocket for a gas turbine which fully satisfies the means, objects, and advantages set forth hereinbefore. While the present invention has been described in the context of specific embodiments thereof, other alternatives, modifications, and variations will become apparent to those skilled in the art having read the foregoing description. Therefore, it is intended to embrace those alternatives, modifications, and variations which fall within the broad scope of the appended claims.

What is claimed is:

1. A system for installing a vane in a gas turbine comprising:

a receptor pocket positioned within a first support structure;

a boot attached to a first end of said vane for insertion into said receptor pocket;

said first support structure having an opening; said receptor pocket being formed by an insert installed in said opening; and said boot on said vane fitting into said insert.

2. A system according to claim 1, wherein said boot is formed from a flexible dampening material.

3. A system according to claim 2, wherein said boot is formed from silicone rubber and is contoured to fit said receptor pocket.

4. A system according to claim 1, wherein said first support structure is an annular ring portion of an inner casing and said receptor pocket is machined into said annular ring portion.

5. A system according to claim 4, wherein said receptor pocket has a curved configuration and said boot has a curvature which matches said curved configuration.

6. A system according to claim 5, wherein said receptor pocket machined into said annular ring portion is open-ended and wherein said boot has a depth greater than a depth of the receptor pocket.

7. A system according to claim 1, wherein a second end of said vane is secured to a second support structure by a pair of bolts.

8. A system according to claim 1, wherein said insert comprises an insert cup.

9. A system according to claim 1, wherein said insert has an outwardly extending, peripheral flange portion and said first support structure is provided with a peripheral ledge to accommodate said peripheral flange portion so that an upper surface of said peripheral flange portion is substantially flush with a surface of said first support structure.

10. A system according to claim 1, wherein said boot is formed from a flexible dampening material.

11. A system according to claim 1, wherein said insert comprises an insert cup and said boot is adhesively secured to said vane.

12. A system according to claim 1, wherein said insert has an outwardly extending, peripheral flange portion about its periphery, said first support structure is provided with a peripheral ledge, and said peripheral flange portion rests on said peripheral ledge so that an upper surface of said peripheral flange portion is substantially flush with a surface of said first support structure.

13. A system according to claim 1, wherein said boot is formed from a flexible dampening material and said insert is formed from at least one of a plastic material and an elastomeric plastic material.

14. A system according to claim 1, wherein said insert is formed from a nylon material baying a graphite filler.

15. A system according to claim 1, wherein said first support structure is an annular ring portion.

16. A system for installing a vane in a gas turbine comprising:

a receptor pocket positioned within a first support structure;

a boot attached to a first end of said vane for insertion into said receptor pocket;

said first support structure having an opening;

said receptor pocket being formed by an insert installed in said opening;

said boot on said vane fitting into said insert; and said opening having a first depth and said insert having a second depth greater than said first depth.

17. A vane for use in a gas turbine comprising:

an airfoil structure having a first end and a second end;

a boot surrounding said first end of the airfoil structure; and said boot being integrally formed with and inseparable from said vane.

18. A method of installing a vane into a gas turbine comprising the steps of:

providing an inner support structure having an opening machined therein;

providing a vane having a boot attached to an inner end;

attaching said vane to said support structure by positioning said boot in said opening;

inserting an insert cup into said opening prior to said attaching step; and said attaching step comprising inserting said boot into said insert cup.

19. A method according to claim 18, further comprising rotating said vane after said attaching step and securing an outer end of said vane to an outer support structure.

* * * * *

UNITED STATES PATENT AND TRADEMARK OFFICE
CERTIFICATE OF CORRECTION

PATENT NO. : 6,910,860 B2
DATED : June 28, 2005
INVENTOR(S) : Samuel L. Glover et al.

It is certified that error appears in the above-identified patent and that said Letters Patent is hereby corrected as shown below:

Column 5,
Line 2, delete "baying" and insert -- having --.

Signed and Sealed this

Thirteenth Day of June, 2006

JON W. DUDAS
*Director of the United States Patent and Trademark Office*